Figure 1:
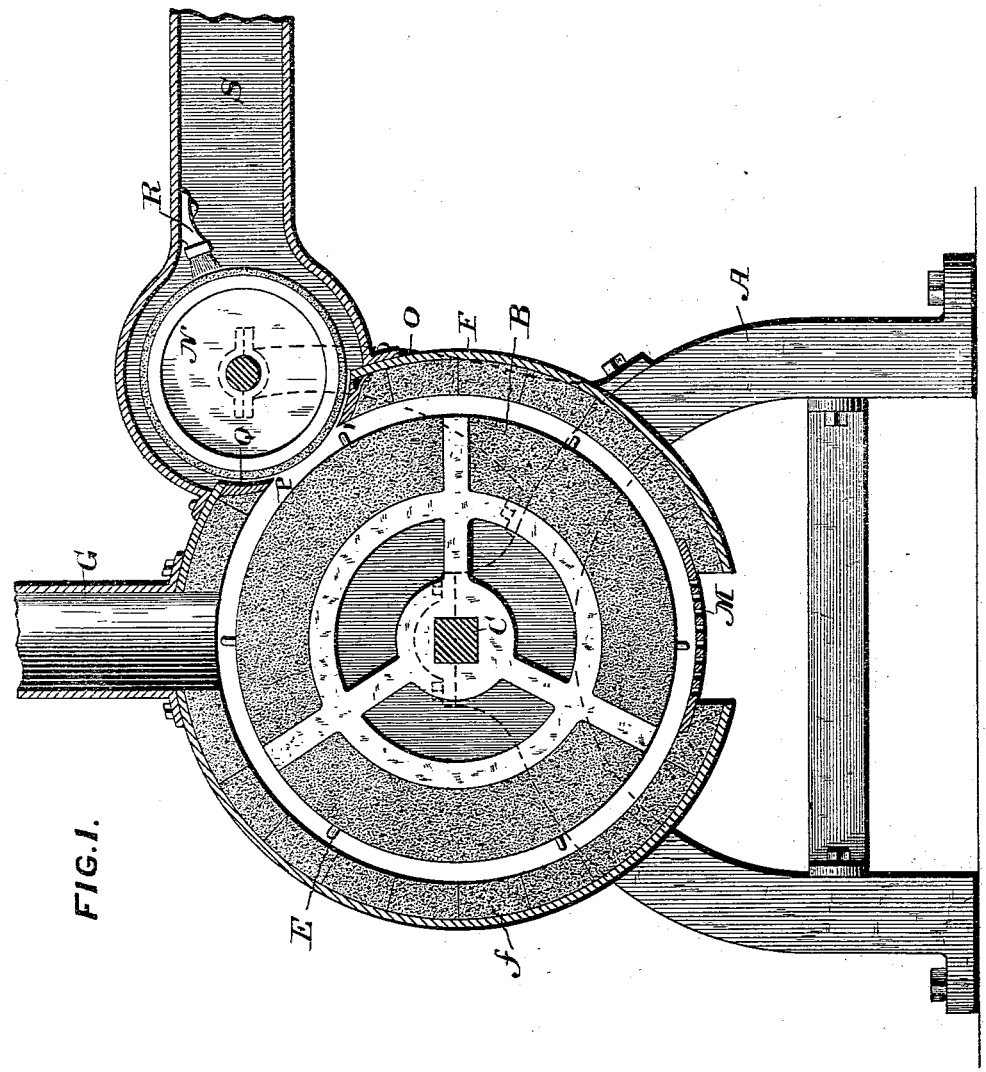

(No Model.) 2 Sheets—Sheet 1.

J. J. FAULKNER.
COTTON SEED DELINTER.

No. 555,310. Patented Feb. 25, 1896.

Witnesses
J. Henry Kaiser
Marie Wilson

Inventor
James J. Faulkner
by E. M. Marble & Sons
Attorneys (No Model.) 2 Sheets—Sheet 2.
J. J. FAULKNER.
COTTON SEED DELINTER.
No. 555,310. Patented Feb. 25, 1896.

Witnesses
J. Henry Kaiser
Marie Wilson

Inventor
James J. Faulkner
by E. M. Marble & Sons
Attorneys.

United States Patent Office.

JAMES J. FAULKNER, OF MEMPHIS, TENNESSEE, ASSIGNOR, BY DIRECT AND MESNE ASSIGNMENTS, TO THE STANDARD COTTON SEED COMPANY, OF ARKANSAS.

COTTON-SEED DELINTER.

SPECIFICATION forming part of Letters Patent No. 555,310, dated February 25, 1896.

Application filed June 13, 1895. Serial No. 552,687. (No model.)

*To all whom it may concern:*

Be it known that I, JAMES J. FAULKNER, a citizen of the United States, residing at Memphis, in the county of Shelby and State of Tennessee, have invented certain new and useful Improvements in Cotton-Seed Delinters; and I do hereby declare the following to be a full, clear, and exact description of the invention, such as will enable others skilled in the art to which it appertains to make and use the same.

My invention relates to improvements in machines for treating cotton-seed, and particularly to improvements in that class thereof known as "delinters;" and it consists in the improved cotton-seed delinter whose construction and arrangement of parts will be hereinafter fully described, and particularly pointed out in the claims.

One of the most important features of construction in a cotton-seed delinter lies in the means used to provide for the conveying of the seed longitudinally through the machine from the inlet-opening to the discharge-opening. Upon the successful operation of the conveying means depends in a large measure the practical efficiency of the machine.

Cotton-seed is a very peculiar substance to deal with, and to delint it successfully it must be subjected uniformly to the abrading action. The conveying means should, further, be so modified as to secure a somewhat greater duration of treatment at the discharge end of the machine, as it is at this point that the short fibers are removed from the seed, and these are somewhat more difficult to remove than the longer lint which is present on the seed when it is subjected to the abrading action.

The object of my invention is to provide the surface of an abrading-cylinder with a seed feeder or conveyer which will act not only to effect the conveying of the seed through the machine at a proper and uniform rate and to delay the treatment of the seed at the discharge end of the machine, but also to assist in the abrading action itself.

In accomplishing the object of my invention I form the first half of the delinting-cylinder with a smooth emeried surface, upon which I place a series of spirally-arranged spikes, and on the latter half a series of circularly-arranged abrading projections. The spiral series of spikes and the circular series of abrading projections act jointly to cause the conveying of the seed through the machine at the desired rate, while they also, and especially the abrading projections, play important parts in the delinting action itself.

My invention is fully illustrated in the drawings which accompany and form a part of this specification, in which the same reference-letters refer to the same or corresponding parts, and in which—

Figure 2:
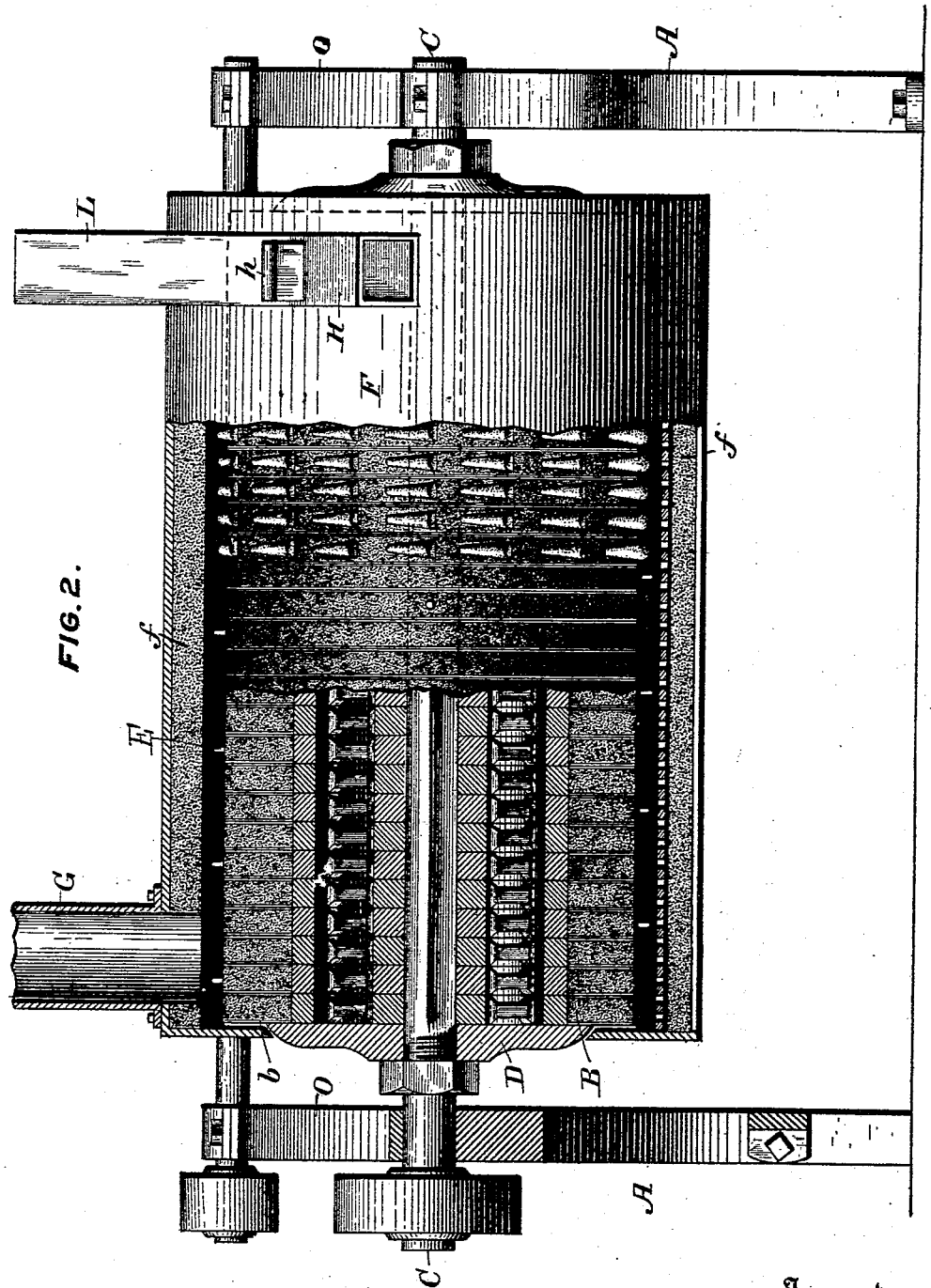

Figure 1 is a transverse section of my machine, and Fig. 2 is a longitudinal section thereof.

Referring to the drawings, A represents the machine-frame, in which is mounted the delinting-cylinder B. The delinting-cylinder is, as shown more clearly in Fig. 2, composed of a number of disks mounted upon a central shaft C and held closely together, so as to form one complete and continuous abrading-surface, by the end flanges D.

The abrading-surfaces of the machine consist of the surface of the delinting-cylinder and the lining *f* of the delinting-cylinder casing F, such lining preferably consisting of emery.

Seed is fed to the machine through the feed-spout G at one end thereof and is discharged through the discharge-spout H at the discharge end of the machine, the valve *h* being used to govern the movement of seed discharged in accordance with the condition of the same. A stand-pipe L, which communicates with the delinting-cylinder through the opening in the casing thereof at the point of the discharge of the seed, acts as a regulator to govern and control the amount of the scouring action to which the seed is subjected. The seed, when its discharge is restricted by the partial or entire closing of the valve *h*, banks up in this stand-pipe and creates a downward pressure upon the abrading-surfaces, which is most beneficial in effecting the desired scouring of the surface of the seed.

The means used in this machine to effect the forward conveying of the seed through the machine consists of a series of spirally-arranged spikes E, placed upon the first half of the delinting-cylinder, and of a series of mole-shaped projections placed on the latter or discharge half thereof. These projecting abrading-surfaces serve to effect a more thorough scouring of the seed during its progress through the latter half of the machine, and thus enable a finer product to be obtained. By varying the pitch of the spirals of the spikes E the rapidity of the conveying of the seed through the machine can be varied as desired.

The dirt, which is always separated from the cotton-seed during the delinting operation, escapes from the casing through perforations M formed in the bottom of the same. The lint, which is separated from the seed by the action of the machine, is withdrawn from the inclosure in which the abrading action takes place by the emery-surfaced cylinder N. This cylinder is journaled in bearings formed on an arm O, projecting from the machine-frame, so that its periphery works through an opening P, which is formed longitudinally in the casing of the delinting-cylinder. Guard-plates Q are used to prevent seed escaping through the opening in the casing. A doffing-brush R acts upon the surface of the lint-removing cylinder and discharges the lint into the flume S, through which it is conveyed to any desired point. This action takes place in spite of the fact that the doffing-brush here shown is stationary. If desired, a rotary doffing-brush can be used instead of the stationary brush shown.

The operation of my machine is as follows: The seed is fed into the machine through the feed-spout G and is at once caused to assume the form of a roll around the delinting-cylinder by reason of the rapid rotation of the same. An abrading action takes place between the abrading-surface of the delinting-cylinder and the casing therefor, the lint, as rapidly as it is removed from the seed, being drawn out of the inclosure in which the delinting operation is proceeding by the revolution of the lint-removing cylinder N. The lint thus removed is doffed from the surface of the cylinder by the doffing-brush R and is discharged into the discharge-flume S. The dirt, which is separated from the seed by the action of the machine, falls out through the perforations M in the delinting-cylinder casing. The seed is gradually fed through the machine by reason of the spiral line of spikes formed on the surface of the first half of the cylinder until it reaches the section of the delinting-cylinder on which abrading projections are formed. As it reaches the portion of the delinting-cylinder upon which the abrading projections are formed, a more thorough scouring of the surface of the seed takes place, and all the fine lint is removed therefrom, so that as it is finally discharged through the discharge-spout H, in quantities regulated by its condition, the surface of the seed is entirely free from lint.

Should any portion of the delinting-cylinder become damaged, the disk holding such damaged portion can be removed from the delinting-cylinder and another disk put on the central shaft to take its place, so that the machine need be stopped for only an instant.

I do not herein claim the form of abrading projections shown, as that is made the subject of a claim in an application filed by me April 22, 1895, Serial No. 456,667; nor do I claim the use of a stand-pipe to control and regulate the condition of the seed under treatment, as that is made the subject of claim in an application filed by me May 4, 1895, Serial No. 548,146; but

What I claim as new, and desire to secure by Letters Patent, is—

1. In a cotton-seed delinter, the combination with a delinting-cylinder one portion of whose abrading-surface is smooth, and the remainder thereof formed with abrading projections, of a casing therefor, seed inlet and discharge openings, means formed on the smooth portion of the delinting-cylinder for feeding the seed forward into the machine, and means for removing the lint separated by the action of the machine, substantially as described.

2. In a cotton-seed delinter, the combination with a delinting-cylinder, one portion of whose abrading-surface is smooth, and the remainder thereof formed with abrading projections, of a casing therefor, seed inlet and discharge openings, a spiral series of spikes projecting from the smooth portion of the delinting-cylinder, and means for removing the lint separated by the action of the machine, substantially as described.

In testimony whereof I affix my signature in presence of two witnesses.

JAMES J. FAULKNER.

Witnesses:
R. W. RAMSEY,
JOHN HALLUM.